(12) United States Patent
Fanfan et al.

(10) Patent No.: US 9,216,918 B2
(45) Date of Patent: Dec. 22, 2015

(54) SELF-CLEANING ELECTRO-REACTION UNIT FOR WASTEWATER TREATMENT AND RELATED PROCESS

(75) Inventors: Pierre Naider Fanfan, Riviere-du-Loup (CA); Roger Lacasse, Notre-Dame du Portage (CA); Marc-Andre Malenfant, St-Modeste (CA)

(73) Assignee: PREMIER TECH TECHNOLOGIES LTEE, Riviere-du-Loup (Quebec) (CA)

(*) Notice: Subject to any disclaimer, the term of this patent is extended or adjusted under 35 U.S.C. 154(b) by 122 days.

(21) Appl. No.: 13/309,097

(22) Filed: Dec. 1, 2011

(65) Prior Publication Data
US 2012/0138482 A1   Jun. 7, 2012

Related U.S. Application Data

(60) Provisional application No. 61/418,424, filed on Dec. 1, 2010.

(51) Int. Cl.
*C02F 1/463*   (2006.01)
*C02F 1/467*   (2006.01)
(Continued)

(52) U.S. Cl.
CPC .............. *C02F 1/463* (2013.01); *C02F 1/4672* (2013.01); *C02F 1/001* (2013.01); *C02F 1/444* (2013.01); *C02F 2001/46119* (2013.01);
(Continued)

(58) Field of Classification Search
CPC ......... B01D 59/40; C02F 1/463; C02F 1/001; C02F 2001/46119; C02F 2303/22; C02F 1/46104; C02F 1/46109
USPC ........... 204/227; 205/742, 751, 755, 756, 761
See application file for complete search history.

(56) References Cited

U.S. PATENT DOCUMENTS 3,405,806 A * 10/1968 Okada ........................... 210/203
3,414,497 A * 12/1968 Kanai ........................... 205/758
(Continued)

FOREIGN PATENT DOCUMENTS

CN    201108767 Y    9/2008
EP    0141981        5/1985
(Continued)

OTHER PUBLICATIONS

Bektaş, N.; Akbulut, H.; Inan, H.; Dimoglo, A. "Removal of phosphate from aqueous solutions by electro-coagulation" Journal of Hazardous Materials. vol. 106B. Jan. 30, 2004. pp. 101-105.*
(Continued)

*Primary Examiner* — Keith Hendricks
*Assistant Examiner* — Steven A. Friday
(74) *Attorney, Agent, or Firm* — Womble Carlyle Sandridge & Rice LLP

(57) ABSTRACT

The present invention relates to the treatment of wastewater by electrochemical reactions. More particularly, an Electro-Reaction Unit (ERU) is disclosed. The ERU is provided with at least one electrolytic cell comprising a pair of self-cleaned electrodes for purifying wastewater. Along with electro-reactions, electrodes of the ERU are submitted to passivation, i.e. coverage with an oxide layer. The present invention provides a solution for alleviating passivation with a self-cleaning system comprising hard elements, confined in a cage and movable therein, for bombardment of the electrodes and rupture of the oxide layer. The present invention further provides a related process.

19 Claims, 9 Drawing Sheets

(51) Int. Cl.
C02F 1/00 (2006.01)
C02F 1/44 (2006.01)
C02F 1/461 (2006.01)

(52) U.S. Cl.
CPC ........... C02F 2001/46133 (2013.01); C02F 2201/003 (2013.01); C02F 2201/4613 (2013.01); C02F 2201/4614 (2013.01); C02F 2201/46135 (2013.01); C02F 2201/46145 (2013.01); C02F 2301/024 (2013.01); C02F 2303/22 (2013.01)

(56) References Cited

U.S. PATENT DOCUMENTS

| | | | |
|---|---|---|---|
| 3,619,391 | A | 11/1971 | Eisner |
| 4,119,518 | A | 10/1978 | Miller |
| 4,176,038 | A | 11/1979 | Moeglich |
| 4,338,192 | A * | 7/1982 | Krasnoff et al. ........... 210/221.2 |
| 4,643,816 | A * | 2/1987 | Geels ......................... 204/230.3 |
| 4,668,369 | A | 5/1987 | King |
| 4,802,991 | A * | 2/1989 | Miller ......................... 205/753 |
| 5,055,186 | A * | 10/1991 | Van Toever .................. 210/150 |
| 6,709,484 | B2 | 3/2004 | Lau et al. |
| 2004/0149561 | A1 | 8/2004 | Tsuchiya et al. |
| 2005/0218081 | A1 * | 10/2005 | Dmitriev et al. ............. 210/702 |
| 2007/0227904 | A1 * | 10/2007 | Miller et al. ................. 205/742 |
| 2008/0087607 | A1 * | 4/2008 | Langlais et al. ............. 210/703 |
| 2008/0223731 | A1 | 9/2008 | Lee |
| 2009/0321251 | A1 * | 12/2009 | Rigby ......................... 204/229.6 |

FOREIGN PATENT DOCUMENTS

| | | | |
|---|---|---|---|
| GB | 1432658 A * | 4/1976 | |
| GB | 1560730 | 2/1980 | |
| JP | 1998174974 | 6/1998 | |
| WO | WO99/27972 A1 | 6/1999 | |
| WO | WO2004/061443 A1 | 7/2004 | |
| WO | WO 2007/115179 | 10/2007 | |
| WO | WO 2010148436 A1 * | 12/2010 | |

OTHER PUBLICATIONS

Guohua Chen, "Electrochemical technologies in wastewater treatment" in "Separation and Purification Technology", vol. 38 (2004), 11-41.

V. Schmalz et al., "Electrochemical disinfection of biologically treated wastewater from small treatment systems by using boron-doped diamond (BDD) electrodes—Contribution for direct reuse of domestic wastewater", in "Water Research", vol. 43 (2009), 5260-5266.

"Waste Water Treatment—Oil/Water Separation and More . . . " by Microdyn Nadir—Advanced Separation Technologies, website(s): www.microdyn-nadir.de; www.microdyntech.com, Accessed: Nov. 30, 2011.

"BIO-CEL—MCP, Mechanical Cleaning Process" by MICRODYN-NADIR GmbH, website: www.microdyn-nadir.de, Accessed: Nov. 30, 2011.

"BIO-CEL, Submerged modules for membrane bioreactors" by MICRODYN-NADIR, website: www.microdyn-nadir.com, Accessed: Nov. 30, 2011.

N. P. Barkley et al., "Emerging Technology Summary—Electro-Pure Alternating Current Electrocoagulation", in "SITE—Superfund Innovative Technology Evaluation" by the United States Environmental Protection Agency (EPA), EPA/540/S-93/504, Sep. 1993.

A. Beagles, "Electrocoagulation (EC)—Science and Applications", for ECO Services International, May 2004, website: www.eco-web.com/editorial/050526.html.

"CFM Systems—Filter Systems" by ItN Nanovation AG, website: www.itn-nanovation.com, Accessed: Nov. 30, 2011.

M.Y.A. Mollah et al., "Fundamentals, present and future perspectives of electrocoagulation", in "Journal of Hazardous Materials", B114 (2004), 199-210.

"Powell Electrocoagulation—Sustainable Technology for the Future", by Powell Water Systems Inc., website: www.powellwater.com, Accessed: Nov. 30, 2011.

"CFM Systems—Pure Efficiency, Innovative filtration technology: sustainable reliability", by ItN Nanovation AG, website: www.itn-nanovation.com, Accessed: Nov. 30, 2011.

* cited by examiner

SELF-CLEANING ELECTRO-REACTION UNIT FOR WASTEWATER TREATMENT AND RELATED PROCESS

CROSS-REFERENCE TO RELATED APPLICATIONS

The present application claims priority to U.S. Provisional Patent Application No. 61/418,424, filed Dec. 1, 2010, the disclosure of which is incorporated herein by reference in its entirety.

FIELD OF THE INVENTION

The present invention generally relates to the treatment of wastewater by electrochemical reactions. More particularly, the present invention concerns a self-cleaning Electro-Reaction Unit (ERU) for a wastewater treatment system and its related treatment process. For this application, wastewater refers to any water not suitable for human consumption without prior treatment.

BACKGROUND OF THE INVENTION

For the clarity of the text, electro-reactions refer to different electro-catalytic phenomena including electro-coagulation, often referred to EC in the art.

Technologies based on electro-reactions are mostly used in the field of water and wastewater treatment. Contrary to other physico-chemical processes for coagulation for example, ERU avoids the use of chemical additives for coagulation which present a risk of water contamination by the other components of the additives (e.g. excess of sulfates and/or chlorides). Moreover, ERU eliminates the need for chemical products stocking, management and handling.

Basically an ERU comprises one or more electrolytic cells. A typical electrolytic cell is the arrangement of electrodes, one anode and one cathode. Electrical current (AC or DC) will cross the electrolyte (e.g. wastewater) from the anode to the cathode. In the case of multiple cells depending on the current alimentation of the cells, different configurations are possible. The electric power circulating between the two electrodes of the electrolytic cell submerged in the wastewater generates, depending on the electrodes material, corrosion of the anode, wastewater decomposition by electrolysis and other electro-catalytic phenomena such as oxidation. These phenomena will produce a multitude of reactive species into the polluted water. Those reactive species will give rise to a certain number of reactions such as coagulation, flocculation, oxidation, reduction, neutralization and others, depending on the water composition and the operational conditions. Thanks to those reactions generated in ERU, a large range of contaminants, from bacteria, viruses, phosphorous, fluoride, heavy metals, oils, grease, arsenic, etc. can be removed from wastewater. In fact, once the reaction phase is completed, the so formed byproducts (coagulated, flocculated, destabilized or neutralized substances) must undergo a separation process in order to complete the pollutant removal.

It is possible to control the reactions happening in the ERU by controlling some of the key parameters such as the electrodes material and the current density. Within an ERU, some pollutants are specifically removed by coagulation and flocculation (e.g. phosphorous) while some others are mostly removed by oxidation and other reactions (e.g. bacteria). While the production of species for coagulation need consumable anode material (e.g. iron or aluminum), species for oxidation are favored by non consumable anode material (e.g. boron doped diamond, etc.). Attempts have also been made to combine two different kinds of electrode material in the electrolytic cells in order to broaden the range of contaminants to be removed. For example, US 2008/0223731A1 describes and claims a combination of electrolytic cells with sacrificial anodes and electrolytic cells with non sacrificial anodes so as to form a more complete hybrid ERU. An example of controlling the ERU reactions by controlling the current density is given by researchers as Guohua Chen in "*Separation and Purification Technologies*", vol. 38 (2004) pp. 11-41". They have suggested a specific current density range of 2 to 2.5 $mA \cdot cm^{-2}$ as optimal for generation of species for coagulation and flocculation with consumable electrodes. Meanwhile, other studies such as V. Schmalz and collaborators in "*Water Resources*", vol. 43 (2009), pp. 5260-5266, describe that in order to obtain good performance in generating species for oxidation, the current density must be set over 2.5 $mA \cdot cm^{-2}$.

The counter-effect of all ER process is the covering of the cathode electrode by an oxide layer of the corresponding anode metal and by ions, salts or biological foulants naturally present in the wastewater or a mixture thereof. In ERU the formation of an oxide layer blocking the electric current flow will be referred to as passivation phenomenon enhanced by other inorganic or organic foulants. The passivation phenomenon is directly related to the current density, the higher the current density, the higher the production of ions and oxide and consequently the higher the passivation phenomenon. The passivation phenomenon is limiting and explains why researchers as the ones cited above tend to give optimal values for current density in order to compensate between performance and passivation problems. Because of this passivation phenomenon, the electrodes need to be changed or cleaned periodically to function properly. This represents a challenge, particularly when ERU is chosen for a wastewater treatment facility where interventions are preferably limited. There is thus a need for a cost-effective ERU capable of continuous operation with few maintenance requirements.

Various automated cleaning systems have been proposed but most of them are inefficient and very expensive to run. For example, the Chinese patent CN 01108767.6 describes and claims a cleaning device comprising a wiper to remove deposits from the electrodes surface. This cleaning device is suitable for removal of organic foulants but fails to remove oxides layers which form on the surface of the electrodes. Another example is the Electrode Surface Activator (ESA) which is described and claimed in the American patent US 2008/0223731A1. This ESA makes use of a plurality of wipers to keep the electrodes from passivation. The ESA is considered as complicated and expensive. Previously known automated cleaning systems, including systems using polarity inversion or brushing/wiping functionalities, have been found insufficiently efficient or too expensive to provide a sustainable solution to fight the continuous formation of the oxide layer and other inorganic and organic foulants on electrodes. The most effective cleaning processes require a manual cleaning intervention with a shutdown of the ERU and are thus an expensive solution. Those cleaning devices and processes are also more appropriate for industrial or municipal wastewater treatment systems, which are often operated in batch and maintained on a daily basis by dedicated staff, and designed, with many treatment trains in parallel, allowing interruption of flow rate in each treatment train for maintenance purposes. On the contrary, smaller wastewater treatment systems are not operated by permanent staff and are often designed with one treatment train. These previous systems will be economically viable only if their maintenance requirements are kept at a minimum. The automation of the ERU is thus important for industrial and large municipal wastewater treatment systems, and even more important in the case of smaller wastewater treatment systems by reduction of maintenance requirements.

Thus, as can be appreciated, there is still a need for wastewater treatment improvement using self-cleaning device. This need is even more felt for non-industrial domestic wastewater treatment systems.

SUMMARY OF THE INVENTION

An object of the present invention is to provide an Electro-reaction Unit (ERU) for treating wastewater that satisfies the above-mentioned need.

According to one aspect of the present invention, that object is achieved with a self-cleaning ERU for treating wastewater, comprising two subsections, namely a reaction chamber and a separation chamber in fluid communication with the reaction chamber.

The reaction chamber comprises an inlet for receiving wastewater, and at least one electrolytic cell comprising a pair of electrodes which are submerged in the wastewater. The electrodes are fed with an electric current under controlled operating conditions to induce electro-chemical reactions for producing simultaneously coagulation and oxidation species. The reaction chamber further comprises a dedicated zone localized at least between the electrodes and hard elements contained within the dedicated zone. The hard elements are movable therein and have a hardness at least greater than a hardness of an oxide layer forming on the electrodes. The reaction chamber further comprise means for providing kinetic energy to the hard elements, thereby causing localized bombardment of the electrodes for constantly removing the undesired oxide layer and other foulants forming on the electrodes.

The separation chamber receives wastewater from the reaction chamber and comprises a separation device for separating a sludge from a treated water.

According to an optional aspect of the ERU, the dedicated zone may be delimited by a confining openwork structure such as a cage. The confining openwork structure may be perforated with apertures, the size of the apertures being smaller than the diameter of the hard elements entrapped therein. Furthermore, the means for providing kinetic energy may be a water propeller generating a water turbulence for movement of the hard elements.

According to another aspect of the present invention, there is provided a process for treating wastewater. The process first comprises a step a) of supplying wastewater into a reaction chamber. Then, the process comprises a step b) of producing simultaneously coagulation and oxidation species by inducing electro-chemical reactions in the wastewater by means of at least one electrolytic cell comprising a pair of electrodes, submerged in the wastewater and fed with an electric current under controlled operating condition. During the step b) of production of the coagulation and oxidation species, the process also comprises a step c) of bombarding the electrodes with hard elements so as to constantly remove an undesired oxide layer and other foulants forming at or near the electrodes, the hard elements having a hardness greater than the hardness of the oxide. The process still comprises a step d) of separating the wastewater from step b) into a sludge and a treated water.

Knowledge of the influence of ERU operation parameters such as current density, ratio A/V and hydraulic retention time (HRT) enable an efficient treatment of wastewater. The present invention proposes operation condition ranges, favoring generation of coagulation, flocculation and oxidation species through various electro-chemical reactions succeeding in destroying a large variety of contaminants, with a single type of consumable electrodes.

It is worth mentioning that throughout the following description when the article "a" is used to introduce an element it does not have the meaning of "only one" it rather means of "one or more". For instance, the ERU according to the invention can be provided with one or more reaction and/or separation chamber, one or more dedicated zone, one or more electrolytic cell, etc. without departing from the scope of the present invention.

BRIEF DESCRIPTION OF THE DRAWINGS

Other objects, advantages and features of the present invention will become more apparent upon reading the following non-restrictive description of preferred embodiments thereof, given for the purpose of exemplification only, with reference to the accompanying drawings in which.

DETAILED DESCRIPTION OF PREFERRED EMBODIMENTS

Figure 1:
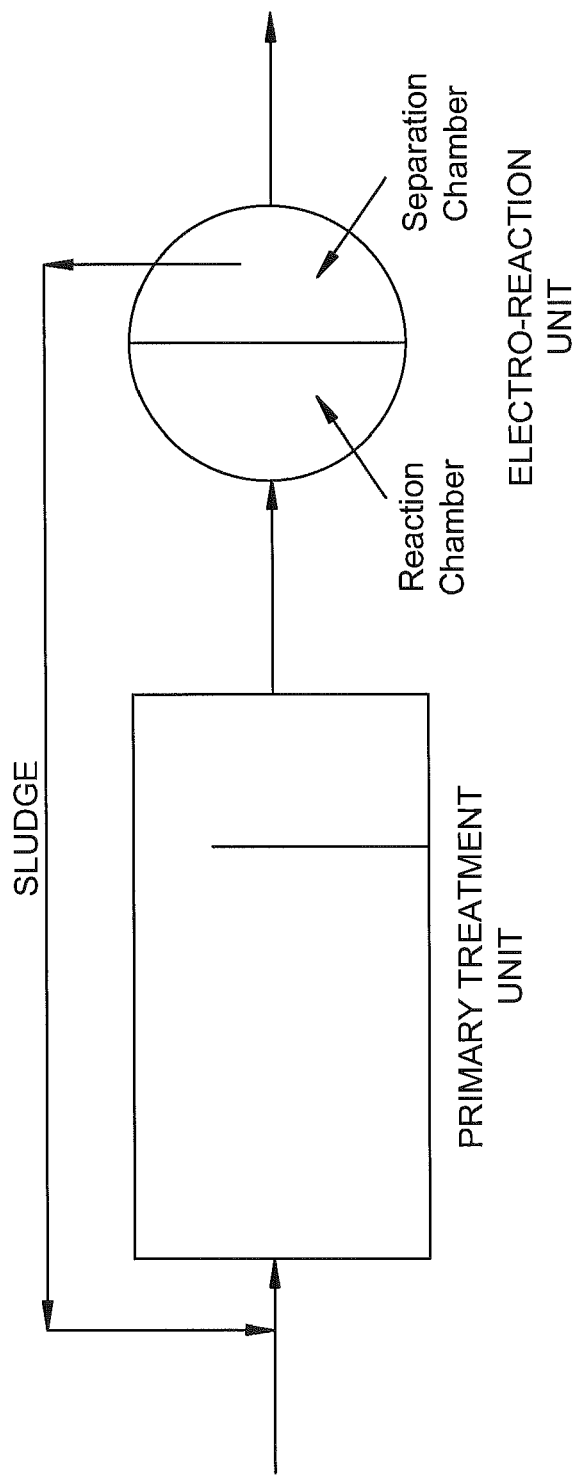
FIG. 1 is a scheme of a wastewater treatment process involving an Electro-Reaction Unit (ERU) according to an embodiment of the present invention.

In the following description, similar features in the drawings have been given similar reference numerals. In order to preserve clarity, certain elements may not be identified in some figures, if they are already identified in a previous figure.

The automated self-cleaning ERU according to the invention can advantageously be used as part of a small wastewater treatment system (<500 cubic meters a day for example) which comprises a primary treatment such as a septic tank. For example, it may be used to further treat the water exiting the septic tank before it is sent to the leach field or to a subsequent treatment unit. It is however worth noting that it may alternatively be used as part of any industrial, institutional, community or commercial wastewater treatment system.

Now referring to FIG. 1, in a wastewater treatment system as represented, wastewater is fed to a primary treatment tank where primary sedimentation occurs. The wastewater, cleared out from its heavier particles and its floatables, is then fed to the ERU, comprising a reaction chamber and a separation chamber, where it will be treated in a continuous mode. Two streams exit from the ERU: a treated water stream and a sludge stream, comprising heavier coagulated particles. The sludge stream is recycled to the septic tank (or primary treatment) or a sludge storage tank by the means of a hydraulic pump while the treated water stream can be infiltrated in soil, reused or sent to further treatment unit or other storage tank.

Preferably, the ERU comprises a flow regulator in order to regulate the flow of wastewater entering the reaction chamber. The wastewater may therefore be treated in a continuous mode at a regulated flow.

Figure 2:
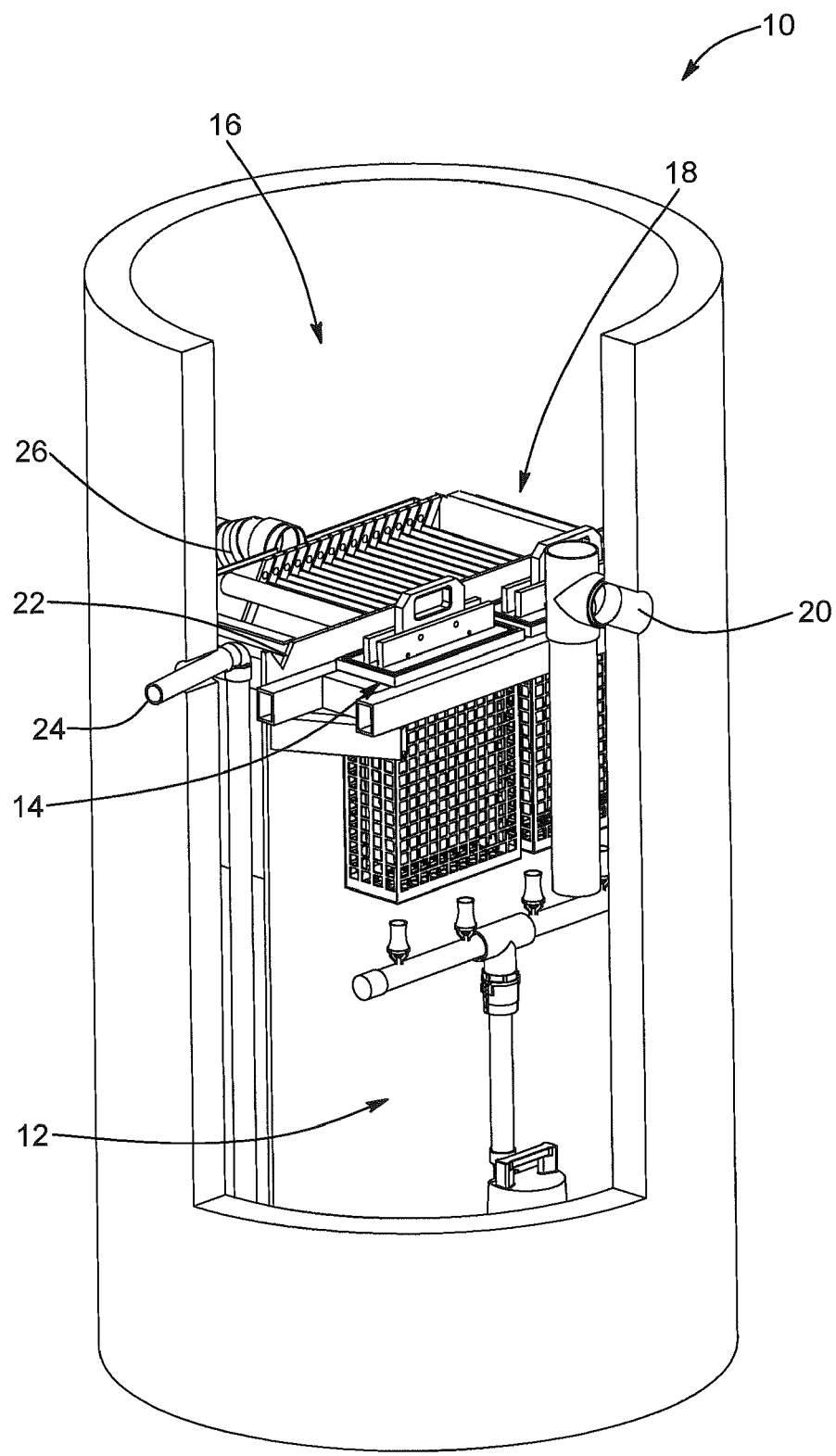
FIG. 2 is a perspective view of an ERU, according to an embodiment of the present invention with a cut-away portion to view the interior of the unit.

Referring to FIG. 2, the ERU 10 comprises the reaction chamber 12 operated in a complete mix mode containing one or more electrolytic cells 14 and the separation chamber 16 operated in a laminar mode containing a separation device. The separation device may be a static decanter such as a lamellar separator 18. The separation device 18 may also be a membrane filtration unit submerged in the separation chamber 16 as better shown in FIG. 9. The reaction chamber 12 is provided with a water inlet 20 for receiving the wastewater from primary treatment unit and a water outlet 22 in fluid communication with a water inlet 22 of the separation chamber. In a preferred embodiment, the inlet-outlet 22 may be a v-shaped outfall as shown in the FIG. 2. The separation chamber 16 comprises a first outlet 24 in communication with an inlet of the septic tank to recycle the sludge stream and a second outlet 26 for the treated water. In use, the ERU 10 receives polluted water where the electrolytic cells 14 generate ER; coagulated particles containing pollutants, such as undesirable nutrients, micro-organisms and pathogens, are separated thanks to the separator 18 forming a phase identified as sludge which is released out of the ERU to the primary treatment tank via the outlet 24; the other phase corresponding to treated water is released out of the ERU 10 via the outlet 26.

The electrolytic cell comprises a pair of electrodes which are connected to a power source. The pair of electrodes comprises an anode and a cathode. The anode will electrochemically corrode (oxidation of the material composing the anode), while the cathode will be subjected to passivation enhanced by inorganic and organic foulants. Depending on the metal constituting the anode (for instance, Al or Fe), the following corrosion phenomenon will occur:

$$Al \rightarrow Al^{3+}(aq)+3e- \quad \text{(equation 1)}$$

$$Fe \rightarrow Fe^{2+}(aq)+2e- \quad \text{(equation 2)}$$

$$Fe^{2+} \rightarrow Fe^{3+}(aq)+e- \quad \text{(equation 3)}$$

These metallic ions in solution ($Al^{3+}$ or $Fe^{3+}$) will react with soluble phosphorus ($PO_4^-$) to produce precipitates as described by the following coagulation reaction in the particular case of aluminum.

$$Al^{3+}+PO_4^{3-} \rightarrow AlPO_4 \quad \text{(equation 4)}$$

Simultaneously, the water is decomposed by electrolysis into oxygen ($O_2$) at the anode and hydrogen gas ($H_2$) at the cathode, as described by the following equations:

$$2H_2O \rightarrow 4H^+ + O_2\uparrow + 4e- \text{(anode)} \quad \text{(equation 5)}$$

$$2H_2O + 2e- \rightarrow 2OH^- + H_2\uparrow \text{(cathode)} \quad \text{(equation 6)}$$

As presented in equation 6, the decomposition of the water at the cathode makes available $OH^-$ ions for the formation of insoluble metallic hydroxides, as given, in the following equation 7 in the particular case of iron.

$$Fe^{3+}(aq)+3OH^-(aq) \rightarrow Fe(OH)_3(s)\downarrow \quad \text{(equation 7)}$$

Within the ERU, other electro-catalytic phenomena can occur in parallel. Depending on the wastewater content, the type of electrodes and the current density, different species can be produced as described by the following equations 8 to 14.

Ozone Formation $$H_2O \rightarrow {}^*OH + H^+ + e^- \quad \text{(equation 8)}$$

$${}^*OH \rightarrow {}^*O + H^+ + e^- \quad \text{(equation 9)}$$

$${}^*O + O_2 \rightarrow O_3 \quad \text{(equation 10)}$$

Peroxide Formation $$2{}^*OH \rightarrow H_2O_2 \quad \text{(equation 11)}$$

Disinfecting Chloride Species Formation $$2Cl^- \rightarrow Cl_2 + 2e^- \quad \text{(equation 12)}$$

$$Cl_2 + H_2O \rightarrow HOCl + H^+ + Cl^- \quad \text{(equation 13)}$$

$$HOCl \rightarrow H^+ + OCl^- \quad \text{(equation 14)}$$

These species responsible for oxidation (ozone, peroxide or chloride), contribute to the cleaning of wastewater by killing a part of the bacteria and pathogens.

One drawback with any ERU is passivation of the electrodes. Whatever the material used, a thin impermeable oxide layer (also referred herein as oxide film) forms with the passing of time on the surfaces of the electrodes. An alumina layer will form on the surface of the electrodes made of aluminum. This oxide layer blocks the electric current and therefore lowers the efficiency of the process.

In order to remove this oxide layer, the ERU of the present invention comprises a device for cleaning the electrodes in a continuous manner. This device for self-cleaning the electrodes comprises a dedicated zone located at least in between the electrodes and allowing localized bombardment of the electrodes by movable hard elements. Preferably, the dedicated zone surrounds the electrodes and is delimited by confining means such as a confining openwork structure. The ERU further comprise means for providing kinetic energy to the hard elements, thereby imparting movement of the elements for constantly removing the oxide layer and other foulants by bombardment.

Figure 3:
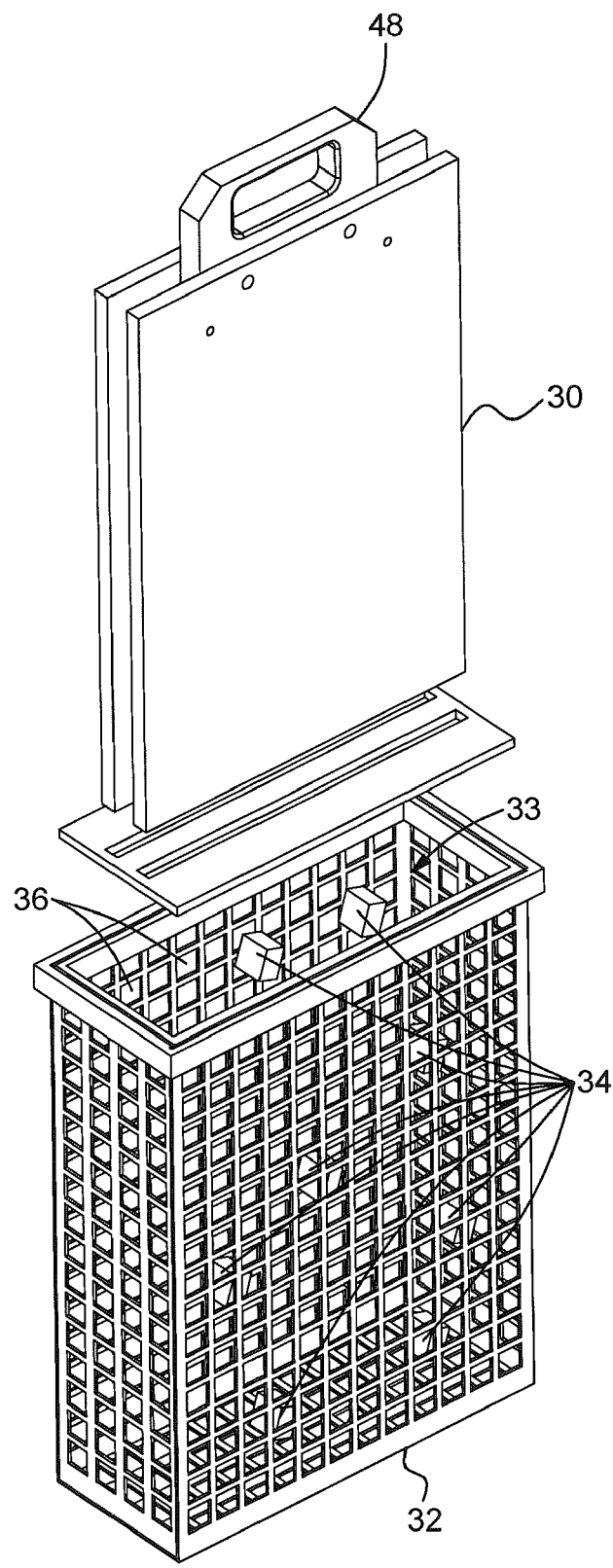
FIG. 3 is an exploded perspective view of the electrolytic cell of FIG. 2 comprising a confining openwork structure and electrodes.
Figure 5:
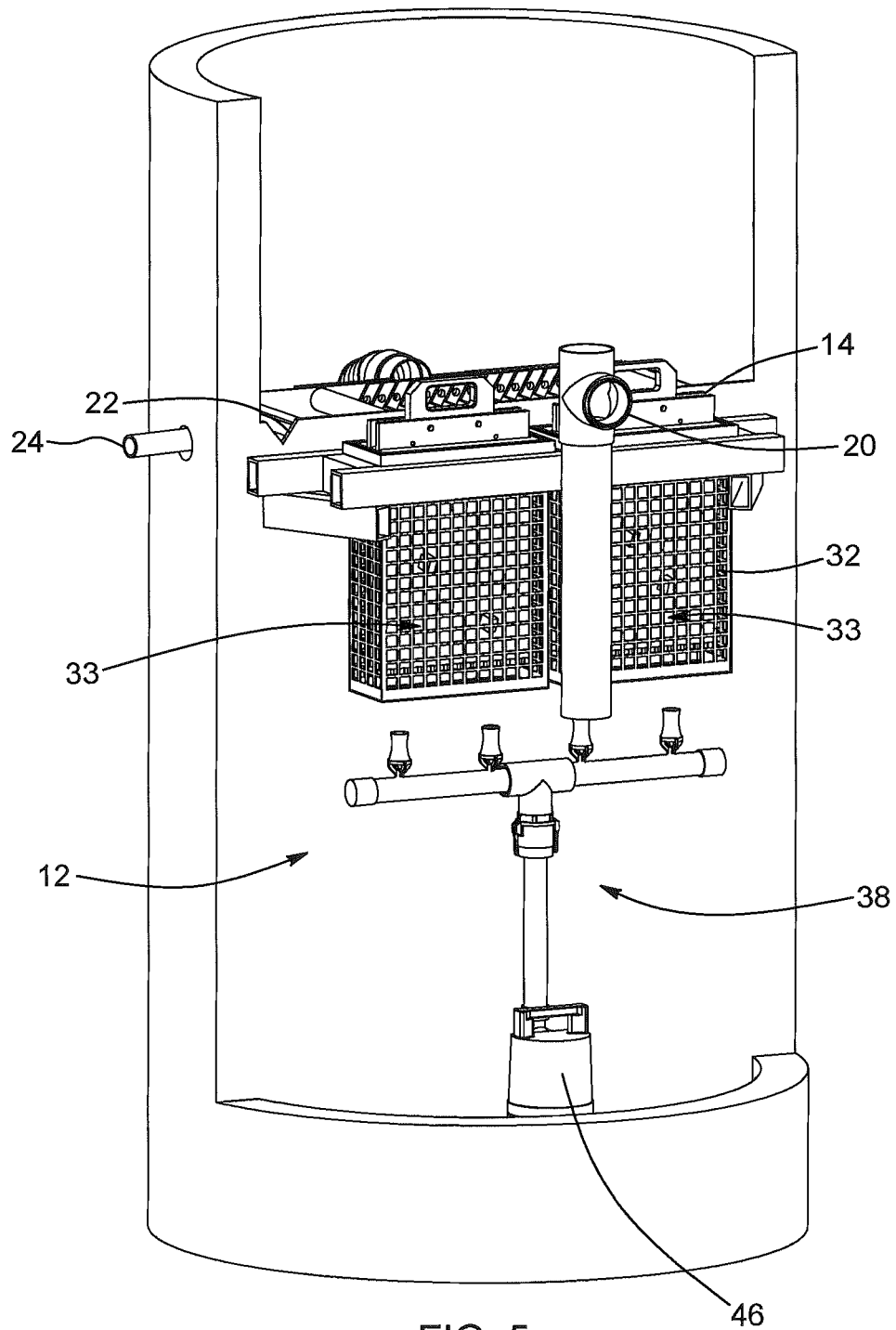
FIG. 5 is another perspective view of the ERU of FIG. 2 with a cut-away portion allowing a better view of the reaction chamber.

Referring to FIGS. 3 and 5, the confining openwork structure, is a cage 32 which confines the electrodes 30 in the dedicated zone 33 wherein a plurality of hard elements 34 are trapped and movable therein. As shown on FIG. 5, the ERU further comprises a water propeller 38 adjacent the cage 32 to thrust water through the cage 32 and generate water turbulence therein. The water propeller 38 is providing kinetic energy to the hard elements 34 thanks to the generated water turbulence. Therefore, the hard elements 34 are allowed to move in all directions and bombard the electrodes' surfaces so as to constantly remove the undesired oxide film formed on the electrodes 30.

Figure 4:
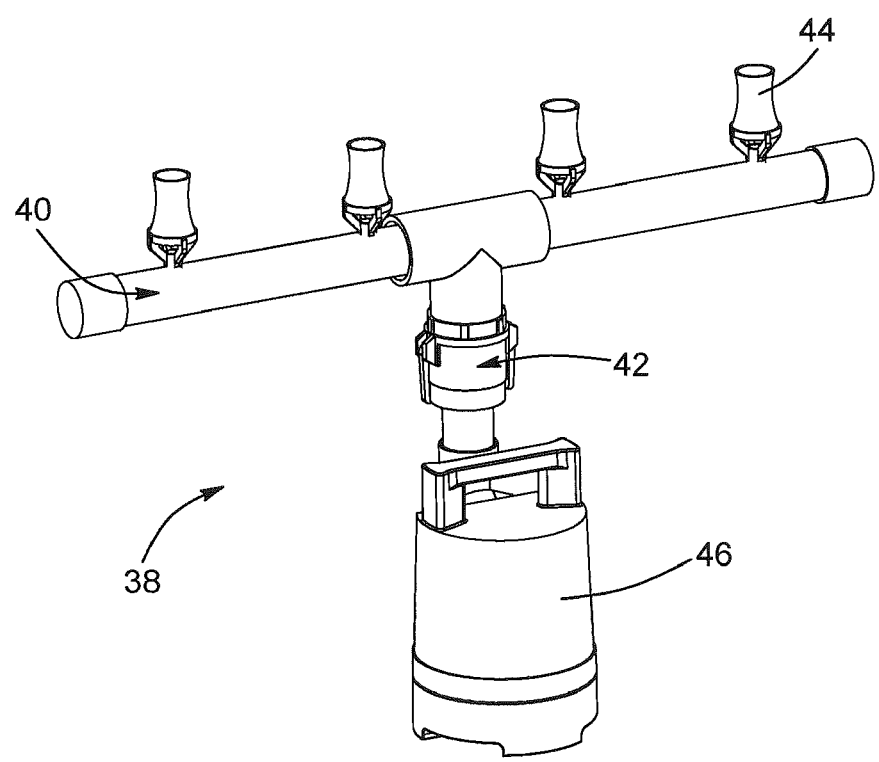
FIG. 4 is a perspective view of the water propeller of FIG. 2.

It should be also understood that the confining means of the present invention are not limited to the confining openwork structure such as the perforated cage as seen on FIGS. 3 to 5, but further include any structure or means defining a dedicated zone in which the hard elements are allowed to bombard the surface of the electrodes.

The hard elements have a hardness at least greater than a hardness of the oxide film forming on the electrodes so as to be able to break the oxide film. The hardness is preferably of at least 20 Brinell. Preferably, the hard elements may be made of plastic material, such as semi-crystalline plastic material. More preferably, the plastic material may comprise acrylonitrile butadiene styrene, polypropylene, polyethylene, high-density polyethylene or any combination thereof.

As best shown in FIG. 3, the electrodes 30 are preferably plate-shaped electrodes disposed in a parallel relation to one another. The electrodes are connected to a DC power supply via handles 48 which comprises wires of a positive and a negative terminal of the DC power supply. The cage 32 may be a rectangular box perforated with apertures 36 having a size allowing the water to flow through and be in contact with the electrodes 30 and the elements 34 but preventing the hard elements 34 from escaping the cage 32.

According to one embodiment, the cage may also be partially perforated. A perforation of the bottom and two opposed side surfaces of the cage would be sufficient for allowing an efficient water circulation therein, It is further worth mentioning that the invention is not limited by the particular shape and disposition for the electrodes and cage as seen in the Figs. Indeed, in another embodiment not shown in the Figs, the two electrodes of the electrolytic cell and the cage may have a cylindrical shape and be substantially concentric with each other. In another embodiment, the confining openwork structure may be created by integrating various overlapping baffles in a specific area of the reaction chamber in order to trap the hard elements within this area. Additionally, in another particular embodiment not shown in the Figs, the electrodes themselves may be concentric with one another, defining the dedicated zone within the in-between annular section and eliminating the need for a separate confining openwork structure. In yet another particular embodiment, the reaction chamber itself may serve as a dedicated zone surrounding the electrodes wherein the hard elements are movable for bombarding the electrodes. In this particular case, the volume of the reaction chamber would be split in a plurality of smaller reaction chambers, each reaction chamber being in fluid-communication with one another and each defining a dedicated zone for bombardment.

Preferably, the electrodes are made of metallic material. The metallic material may comprise iron, platinum, steel, carbon, copper, metal doped diamond or a mixture thereof. More preferably, the electrodes are sacrificial electrodes. The sacrificial electrodes may comprise aluminum because aluminum ions are stable when precipitated with pollutants in anaerobic conditions. Alternatively, the sacrificial electrodes may comprise iron or a mixture of aluminum and iron.

Turning now to FIGS. 4 and 5, the water propeller 38 is placed right under the cage 32 and the electrolytic cell 14. The water propeller 38 comprises a pipe segment 40 closed at both ends and provided with a water inlet 42 and a plurality of nozzles 44 for water propulsion towards the cage 32. An hydraulic pump 46 is in fluid communication with the water inlet 42 for feeding the nozzles 44 with pressurized water. The water is propelled out of the nozzles 44 to create a vigorous water turbulence within the dedicated zone 33, communicating kinetic energy to the hard elements 34 entrapped in the cage 32 through the apertures 36. As a consequence, the hard elements 34 are moving energetically in all directions within the cage 32, thereby causing the elements 34 to collide with or bombard the surface of the electrodes 30 and destroy the oxide layer or any accumulated organic or inorganic film present on the electrodes, thanks to the force of the impacts.

In another embodiment of the invention not shown in the Figs, the water propeller may be configured differently (non submersible pump, at least one nozzle) or placed differently with respect to the dedicated zone, as long as it provides strong water turbulence and causes the elements to collide with the surface of the electrodes. For instance, the water propeller could be facing one side surface of the confining openwork structure; or the nozzles may be located anywhere around or inside the dedicated zone in order to provide turbulence.

In yet another embodiment not shown in the Figs, the means for providing kinetic energy to the hard elements may comprise a mixer or a propeller without nozzle located under or beside the electrodes. These means for providing kinetic energy may also comprise a motor imparting movement to linkers, the hard elements being connected to each other with these linkers. The linkers may be made of rigid or flexible material.

Figure 6:
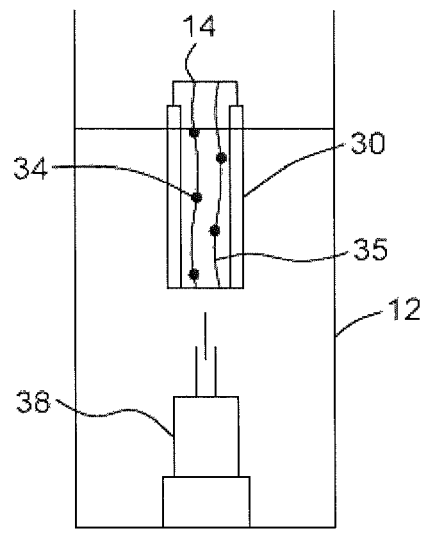
FIG. 6 is schematic view of a reaction chamber, according to another embodiment of the present invention.

Referring to FIG. 6, the dedicated zone 33 for local bombardment of the electrodes 30 is defined by an area between the electrodes 30 themselves. The hard elements 34 for bombardment are moving between the two electrodes and retained inside the dedicated zone by a plurality of flexible wires 35. More particularly, each flexible wire 35 gathers a specific amount of elements 34 by linking them to one another, each wire 35 extending vertically from an upper portion of the electrolytic cell 14 to a lower portion of the electrolytic cell 14 in between the electrodes 30. The movement of the elements 34 is resulting from the water turbulence created by the water propeller 38 installed under the electrodes. The wires 35 are sufficiently flexible to bend in any direction and allow the elements 34 to bombard the electrode's surface under the action of the turbulence.

In another embodiment, the hard elements may be linked to one another by rigid wires or linkers which are put in motion or vibration for allowing the linked hard elements to bombard the electrodes 30. The rigid linkers may be driven by a mechanical device generating the required kinetic energy for cleaning efficiency.

Figure 7:
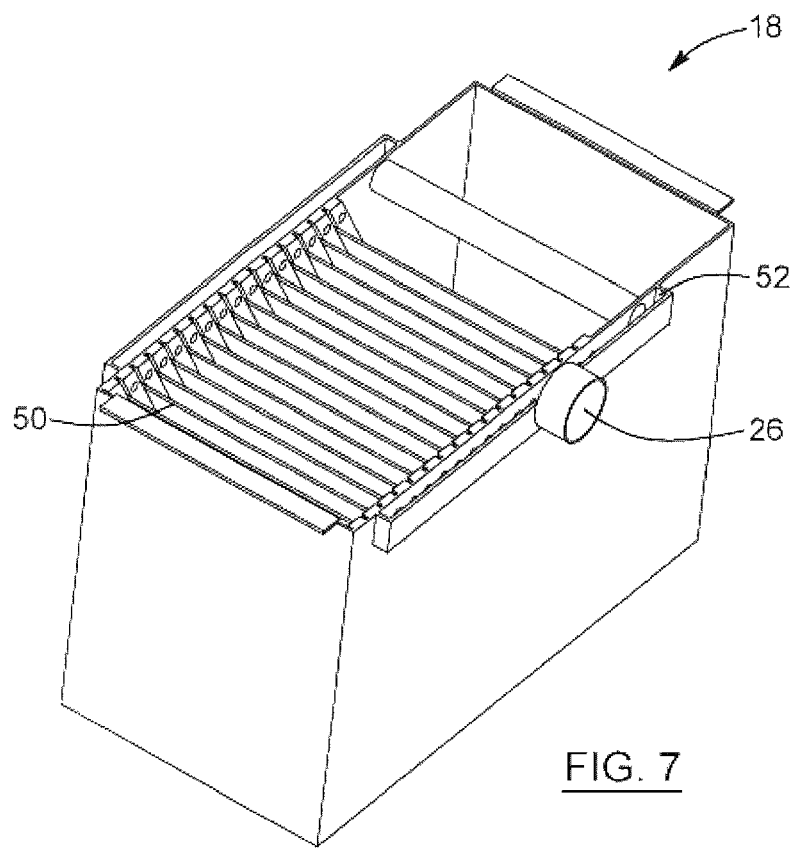
FIG. 7 is an isolated perspective view of the lamellar separator of FIG. 2.
Figure 8:
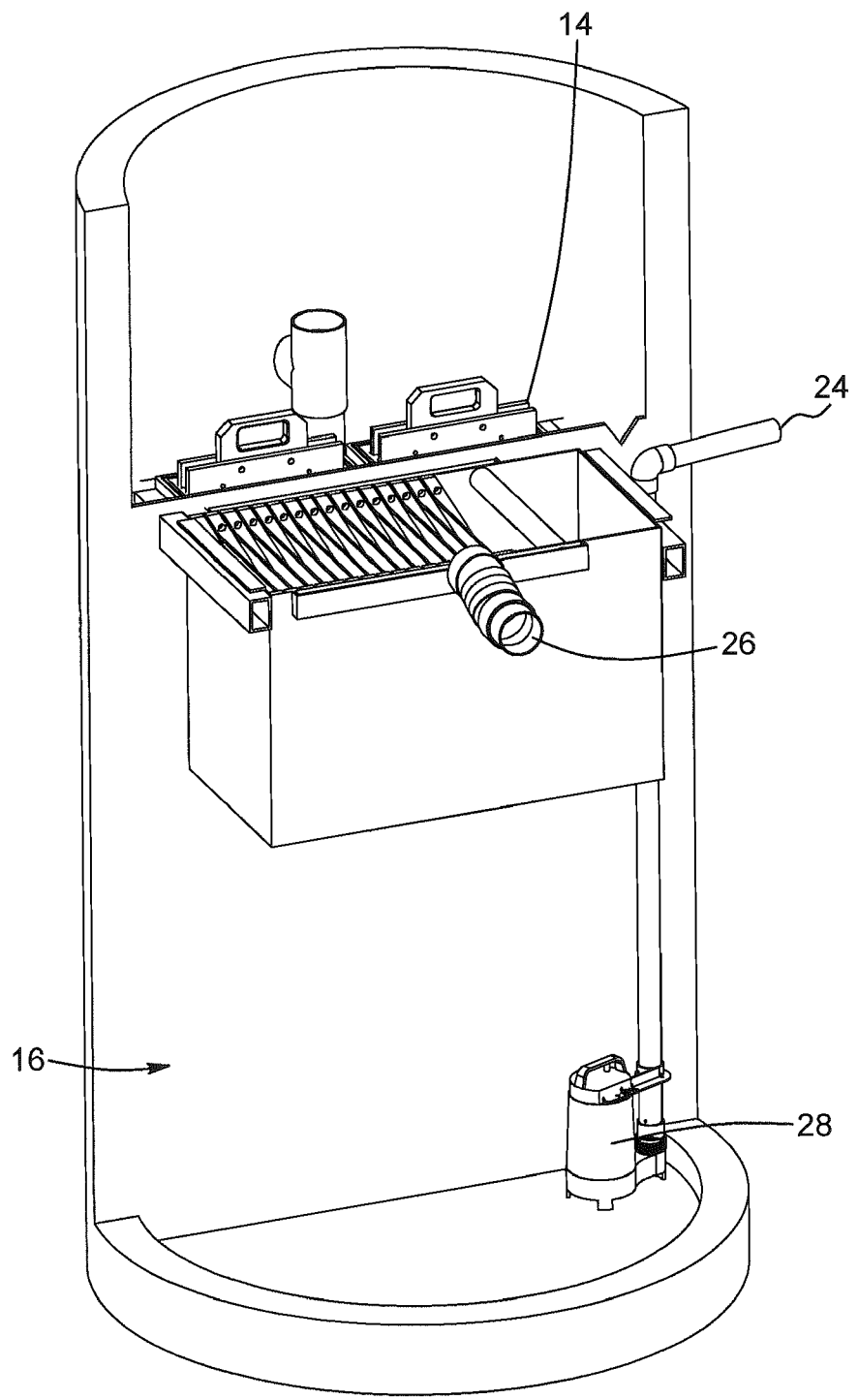
FIG. 8 is another perspective view of the ERU of FIG. 2 with a cut-away portion allowing a better view of the separation chamber, according to an embodiment of the present invention.

Referring now to FIGS. 7 and 8, the separation device is a lamellar separator 18 contained in the separation chamber 16 and comprising a plurality of angled spaced-apart lamellas 50. These lamellas 50 operate as a filter to separate the metal-pollutant precipitates, fragments of broken oxide layer and other separable foulants, from the water. These previously-mentioned pollutants deposit as a phase identified as sludge which will be recycled by a pump 28 through an outlet 24. Water collectors 52 located on both sides of the lamellar separator 18 drive the treated water through an outlet 26 towards further treatment unit or storage tank.

In another embodiment not illustrated in the Figs, lamellas may be replaced by a tubular structure of different shapes (e.g. a hexagonal section).

Figure 9:
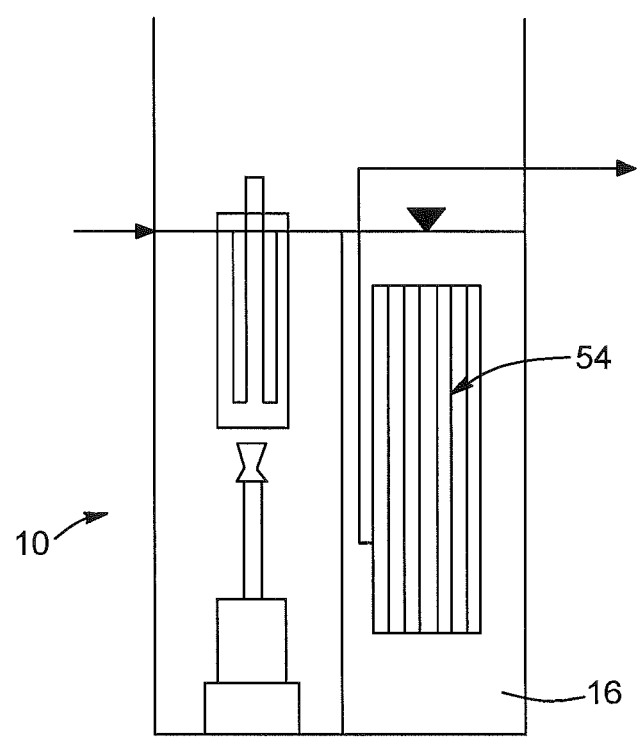
FIG. 9 is a schematic view of an ERU comprising a membrane filtration unit according to another embodiment of the present invention.

In yet another embodiment shown in FIG. 9, the separation device is a membrane filtration unit 54, including membranes, submerged in the separation chamber 16. Preferably, the membranes may comprise hollow fibers or flat sheets with micro or ultra filtration pore's size.

It should be understood that the separation device would refer to any physical device enabling sedimentation, sand filtration, membrane filtration, centrifugation or the like.

Furthermore, the present invention advantageously offers the possibility of generating simultaneously coagulation, flocculation and oxidation species with sacrificial electrodes only, thereby eliminating the need for adjacent electrolytic cell with non sacrificial electrodes which are very expensive.

This simulatenous generation of coagulation, flocculation and oxidation species is enabled by the use or control of key operation conditions, such as current density, ratio A/V and Hydraulic Retention Time (HRT), resulting in efficient water cleaning and disinfection. The current density is defined as the current intensity divided by the surface of the electrodes. The A/V ratio is defined as the ratio between the surface of the anode and the volume of the reaction chamber. The HRT is defined as the ratio between the volume of the reaction chamber and the flow rate of the wastewater entering the reaction chamber.

More particularly, a narrow value range for the above-mentioned operating conditions is adequate to produce sufficient species for coagulation to remove nutrients such as phosphorous while simultaneously producing a wide broad of species for oxidation to effectively kill microorganism and pathogens at up to 99.99%. The optimal value of the current density may range from about 1.5 to about 8 $mA \cdot cm^{-2}$. Preferably, the optimal value of the current density may be 3 $mA \cdot cm^{-2}$. The optimal value of the ratio A/V may range from about 0.2 to about 1.4 $m^2 \cdot m^{-3}$. Preferably, the optimal value of the ration A/V may be 0.6 $m^2 \cdot m^{-3}$. The optimal value of the HRT may be at least 6 hours. These previous mentioned operation ranges are an inventive selection of key operation conditions which enables, in combination of the self-cleaning device, an improved water cleaning efficiency, low electric power consumption, low footprint and secure operation. It should be understood that all the above values may have a 3% incertitude range, mainly due to the precision of the employed measurement apparatus.

In a preferred embodiment, in addition to the continuous self-cleaning of the electrodes, a polarity inversion of the DC type electric alimentation of the electrolytic cell may be performed periodically in order to alleviate the passivation phenomenon of the cathode. As a result, each electrode plays alternately the role of the cathode and the anode. For sacrificial (consumable) electrodes, this polarity inversion will prevent entire consumption of the anode alone by converting alternatively the anode into cathode for a given period of time and help maintain an equal consumption of both electrodes. Replacement of the electrodes is therefore done after a longer period of operation time depending on the ERU use.

According to another aspect of the present invention, there is provided a process for treating wastewater.

The process first comprises a step a) of supplying wastewater into a reaction chamber of an ERU as described above. The process further comprises a step b) of producing simultaneously coagulation and oxidation species by inducing electro-chemical reactions in the wastewater by means of at least one electrolytic cell. The electrolytic cell is contained in the reaction chamber and submerged in the wastewater. The electrolytic cell comprises a pair of electrodes which are fed with an electric current under controlled operating conditions. Preferably, the controlled operating conditions are the current density, A/V ratio, Hydraulic Retention Time (HRT) or a combination thereof for removing undesirable pollutants. The process further comprise a step c), occurring simultaneously to previous-mentioned step b), of bombarding the electrodes with hard elements so as to constantly remove an undesired oxide layer and other foulants which may form at or near the electrodes. Preferably, the bombarding of the electrodes is enabled by generating a water turbulence to provide kinetic energy to the hard elements. The process further comprises a step d) of separating the wastewater into a sludge stream and a treated water stream. The process may also be operated in batch or continuous mode.

According to a preferred embodiment of the process, a step of inversion of the polarity of the electric current is performed periodically in order to invert the status of the electrodes. Indeed, after a given period of time, the electrode which was acting as a cathode facing passivation, will behave as an anode facing total consumption. As already mentioned, this current inversion allows an alleviation of passivation and an equal consumption of each electrode, which advantageously increases the operation time without having to replace the electrodes.

Figure 10:
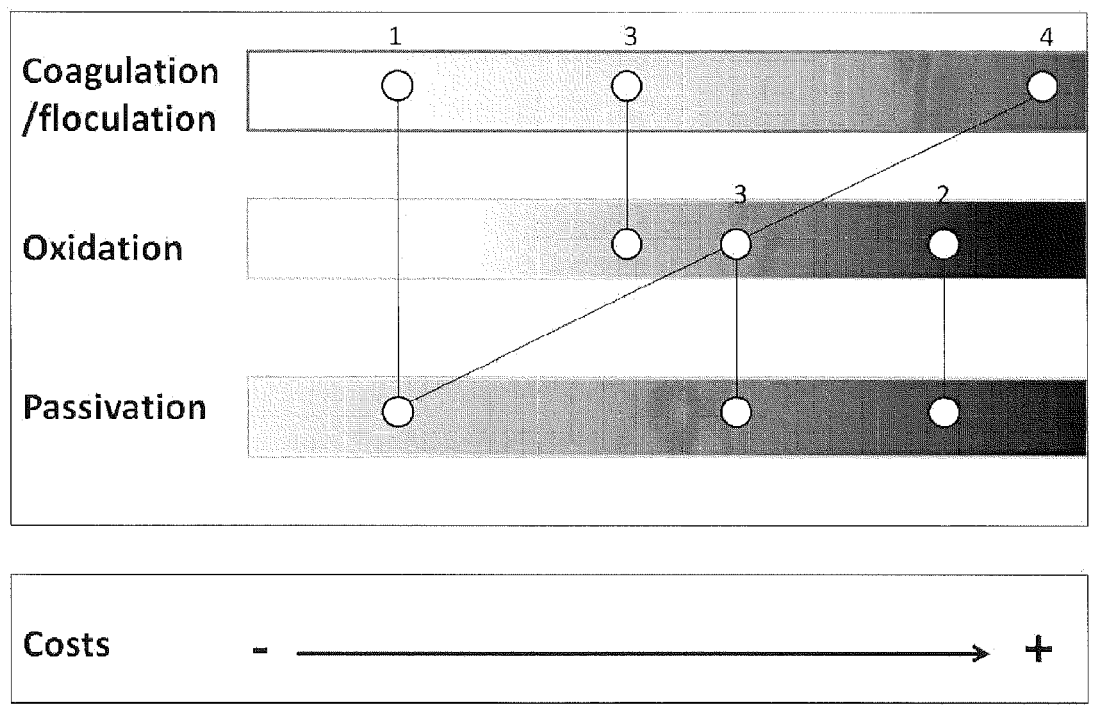
FIG. 10 is a scheme illustrating the effectiveness of an ERU according to an embodiment of the present invention.

Referring to FIG. 10, a schematic representation of what have been disclosed in the art is presented through four cases allowing a comparison with the present invention. The intensity of the color illustrates the effectiveness of the reaction. The vertical lines 1 and 2 represent the usual practice. The line 1 shows ER with consumable electrodes allowing mainly generation of species for coagulation and flocculation. The line 2 represents the use of non consumable electrodes generating only species for oxidation. Its position on the scheme reveals high overall cost because of the prices of the non consumable electrode material and the high current density, combined with cleaning interventions or process required to fight passivation and other foulants accumulation. As can be appreciated from the scheme, the passivation problems grow strongly as performance grows. The lines 3 represent what have been claimed in the American patent US 2008/0223731A1. By the use of two different sets of electrodes they may be able to generate species for coagulation and flocculation as well as for oxidation. Once again they will not be cost effective for small system as the non consumable electrode material is expensive and as they have to face passivation problems. The diagonal line 4 actually represents what have been invented. This line 4 confirms that choosing the right set of operational parameters combined with an efficient self-cleaning device, allows the use of just one kind of consumable electrodes to generate high level of species for coagulation along with acceptable generation of species for oxidation, while virtually eliminating passivation and similar phenomenon problems and keeping low overall cost.

The present invention provides an ERU and related process which comprise a self-cleaning device which, combined with state of the art knowledge of the electrolytic principles, overcomes at least some of the technical problems known in the art. One main advantage of the present invention is the efficacy and the continuous operation in treating water containing a plurality of contaminants, in a cost effective manner with the use of a single type of electrodes, sacrificial electrodes.

The above-mentioned advantages of the present invention will be better shown in the light of the following example.

EXAMPLE

The following example relates to the efficiency of the self-cleaned ERU according to the embodiments of the present invention.

An experiment was conducted over a period of one year in which wastewater was treated in an ERU with a self-cleaning system without changing operation parameters such as current density, A/V ratio or Hydraulic Retention Time.

Table 1 presents the results of the wastewater treatment over this period where the electrodes were self-cleaned and not replaced.

TABLE 1

Performance of the ERU with self-cleaning system:

| Parameter | Units | Raw effluent | ERU effluent | Removal |
|---|---|---|---|---|
| TSS | mg/L | 176 ± 45 | 38 ± 10 | 78% |
| $BOD_5$ | mg/L | 195 ± 22 | 112 ± 20 | 43% |
| Total P | mg/L | 9.1 ± 0.8 | 0.6 ± 0.2 | 93% |
| Fecal coliforms[1] | counts/ 100 mL | 715,000 | 5,300 | 2.1 log |
| pH | | 7.3 ± 0.1 | 7.6 ± 0.2 | n/a |

The efficiency of the treatment is based on the comparison of values of Total Suspended Solids (TSS), Biochemical Oxygen Demand ($BOD_5$), total quantity of phosphorous and quantity of fecal coliforms present in the wastewater (raw effluent) before entering the ERU with the values of the same parameters after the treatment by ERU (ERU effluent). The removal quantity is the result of the comparison calculation. The removal values have been kept stable during the whole experimentation year while operating in an ERU with self-cleaning system.

Similar removal values were obtained in an ERU not equipped with a self-cleaning device, they were stable only over a period of 3 to 4 weeks. After this time, cleaning of the electrodes was required to obtain a good efficiency.

These results show the utility and the efficiency of a self-cleaning device for an ERU.

It should be understood that the embodiments described and illustrated herein are meant as exemplary only and should not limit what has actually been invented.

What is claimed is:

1. A self-cleaning electro-reaction unit for treating wastewater, comprising:
   a DC power supply;
   a reaction chamber comprising:
     a chamber inlet for receiving wastewater;
     at least one electrolytic cell comprising a pair of aluminum electrodes connected to the DC power supply, the pair of electrodes comprising a cathode and an anode, submerged in the wastewater to induce electro-chemical coagulation reactions of soluble phosphorous;
     a cage located within the reaction chamber, the cage surrounding the electrodes and delimiting a portion of the reaction chamber, at least a bottom surface of the cage and two opposed side surfaces of the cage being provided with apertures sized to allow a flow of water in and out the cage;
     hard elements contained within the cage and movable therein, the apertures of the cage being also sized to trap the hard elements in the cage, the hard elements having a hardness at least greater than a hardness of an oxide film forming on the electrodes; and
     a water propeller adjacent the cage, the water propeller comprising:
       a pipe segment provided with a water inlet and a plurality of nozzles; and
       a pump in fluid communication with the water inlet for feeding the nozzles with pressurized water from within the reaction chamber, the water propeller being configured to provide kinetic energy to the hard elements, independently of a flow of water in and out of the reaction chamber, by propelling the pressurized water from within the reaction chamber out of the nozzles and through the cage to generate water turbulence within the cage, thereby causing localized bombardment of the electrodes for constantly removing an undesired oxide layer and other foulants forming on the electrodes.

2. The electro-reaction unit according to claim 1, wherein the hard elements are made of a plastic material.

3. The electro-reaction unit according to claim 2, wherein the plastic material comprises acrylonitrile butadiene styrene, polypropylene, polyethylene, high-density polyethylene or any combination thereof.

4. The electro-reaction unit according to claim 1, comprising a flow regulator to regulate the flow rate of the wastewater entering the reaction chamber.

5. The electro-reaction unit according to claim 1, further comprising a separation chamber in fluid communication with the reaction chamber to receive wastewater from the reaction chamber, the separation chamber comprising a separation device configured to separate a sludge from a treated water.

6. The electro-reaction unit according to claim 5, wherein the separation device is a lamellar separator equipped with a pump for lamellas cleaning purposes and for transferring the sludge to a further treatment unit or storage tank.

7. The electro-reaction unit according to claim 5, wherein the separation device is a membrane filtration unit submerged in the separation chamber.

8. The electro-reaction unit according to claim 1, wherein the cage has a rectangular shape.

9. The electro-reaction unit according to claim 1, wherein the electrodes are vertically-oriented.

10. The electro-reaction unit according to claim 1, wherein the nozzles are arranged below the bottom surface of the cage to propel the pressurized water vertically upward into and through the cage, along the electrodes.

11. The electro-reaction unit according to claim 10, wherein the nozzles are arranged along a length of the cage.

12. A self-cleaning electro-reaction unit for treating wastewater, comprising:
   a DC power supply;
   a reaction chamber comprising:
     a chamber inlet for receiving wastewater;
     at least one electrolytic cell comprising a pair of aluminum electrodes connected to the DC power supply, the pair of electrodes comprising a cathode and an anode, submerged in the wastewater to induce electro-chemical coagulation reactions of soluble phosphorous, the electrodes being vertically-oriented;
     a cage located within the reaction chamber, the cage surrounding the electrodes and being provided with apertures sized to allow a flow of water in and out of the cage, wherein the cage is delimiting a portion of the reaction chamber, and wherein at least a bottom surface of the cage and two opposed side surfaces of the cage are provided with the apertures;
     hard elements contained within the cage and movable therein, the apertures of the cage being also sized to trap the hard elements in the cage, the hard elements having a hardness at least greater than a hardness of an oxide film forming on the electrodes; and
     a water propeller adjacent the cage, the water propeller comprising:
       a pipe segment having two closed ends and located below the cage, the pipe segment being provided with a water inlet and a plurality of nozzles arranged below the cage, along a length of the cage; and
       a pump in fluid communication with the water inlet of the pipe segment for feeding the nozzles with pressurized water from within the reaction chamber, the water propeller being configured to provide kinetic energy to the hard elements, independently of a flow of water in and out of the reaction chamber, by propelling the pressurized water from within the reaction chamber out of the nozzles, vertically upward into and through the cage along the vertically-oriented electrodes, the vertically-propelled pressurized water generating water turbulence within the cage and around the electrodes, thereby causing localized bombardment of the electrodes by the hard elements for constantly removing an undesired oxide layer and other foulants forming on the electrodes.

13. The electro-reaction unit according to claim 12, further comprising a separation chamber in fluid communication with the reaction chamber to receive wastewater from the reaction chamber, the separation chamber comprising a separation device configured to separate a sludge from a treated water.

14. A process for treating wastewater comprising:
a) supplying wastewater into a reaction chamber at a regulated flow rate;
b) controlling operating conditions comprising a current density, an A/V ratio and a hydraulic retention time (HRT) to simultaneously remove soluble phosphorous pollutants by coagulation and produce oxidation species by inducing electro-chemical reactions in the wastewater by means of at least one electrolytic cell comprising a pair of aluminum electrodes, submerged in the wastewater and fed with a DC electric current under controlled operating conditions, the pair of electrodes being a cathode and an anode;
c) simultaneously to step b), bombarding the electrodes with hard elements contained within a cage located within the reaction chamber, the cage surrounding the pair of electrodes and delimiting a portion of the reaction chamber, at least a bottom surface of the cage and two opposed side surfaces of the cage being provided with apertures sized to allow a flow of water in and out of the cage, so as to constantly remove an undesired oxide layer and other foulants forming at or near the electrodes, the hard elements having a hardness greater than the hardness of the oxide; and
d) separating the wastewater from step b) into a sludge and a treated water;
wherein the bombarding comprises propelling pressurized water from within the reaction chamber through the cage and generating water turbulence within the cage using a water propeller for providing kinetic energy to the hard elements independently of a flow of water in and out of the reaction chamber, the water propeller comprising a pipe segment provided with a water inlet and a plurality of nozzles; and a pump in fluid communication with the water inlet for feeding the nozzles with pressurized water from within the reaction chamber.

15. The process according to claim 14, wherein the current density ranges from 1.5 to 8 $mA \cdot cm^{-2}$.

16. The process according to claim 14, wherein the current density is 3 $mA \cdot cm^{-2}$.

17. The process according to claim 14, wherein the A/V ratio ranges from 0.2 to 1.4 $m^2 \cdot m^{-3}$.

18. The process according to claim 14, wherein the A/V ratio is 0.6 $m^2 \cdot m^{-3}$.

19. The process according to claim 14, wherein the hydraulic retention time (HRT) is of at least 6 hours.

* * * * *